Figure 1:
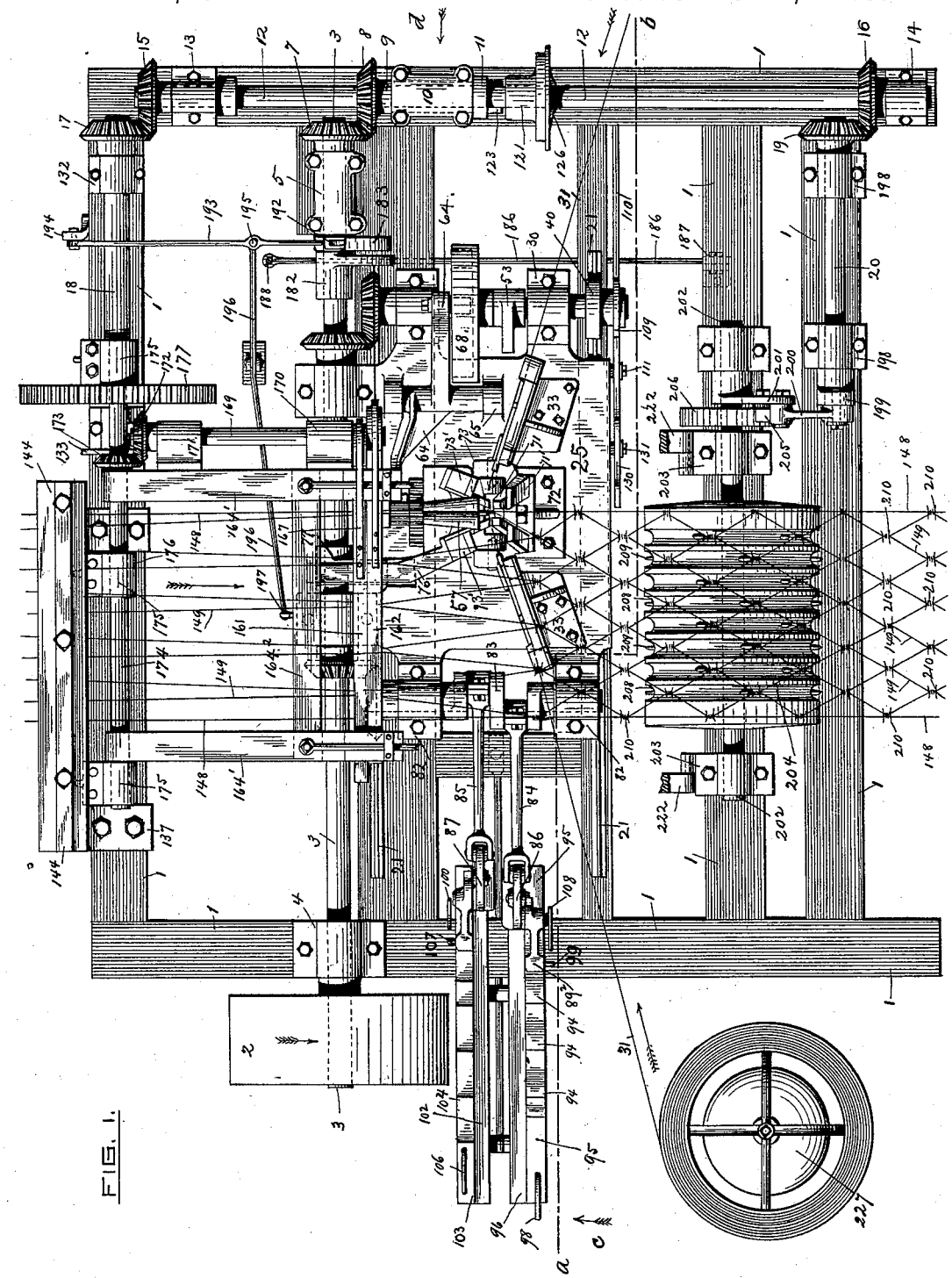

(No Model.) 9 Sheets—Sheet 1.

J. D. CURTIS.
MACHINE FOR MANUFACTURING BARB WIRE MESH FENCING.

No. 364,754. Patented June 14, 1887.

WITNESSES: INVENTOR:

(No Model.) 9 Sheets—Sheet 2.

J. D. CURTIS.
MACHINE FOR MANUFACTURING BARB WIRE MESH FENCING.

No. 364,754. Patented June 14, 1887.

WITNESSES:

INVENTOR:
John D. Curtis
by John C. Dewey
Attorney.

(No Model.)  9 Sheets—Sheet 3.

J. D. CURTIS.
MACHINE FOR MANUFACTURING BARB WIRE MESH FENCING.

No. 364,754.  Patented June 14, 1887.

WITNESSES:  INVENTOR:

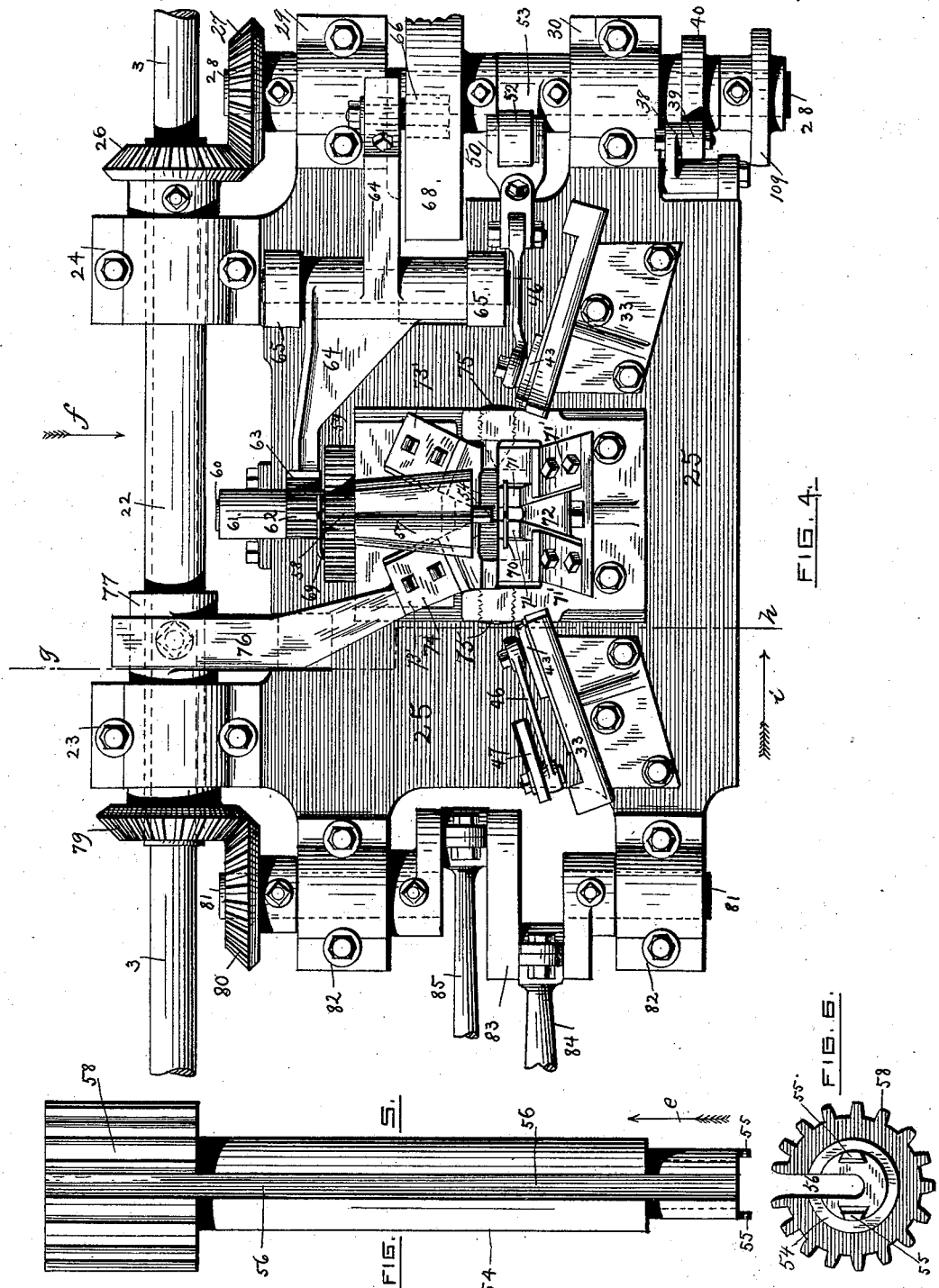

(No Model.)　　　　　　　　　　　　　　　　　　9 Sheets—Sheet 5.
J. D. CURTIS.
MACHINE FOR MANUFACTURING BARB WIRE MESH FENCING.

No. 364,754.　　　　　　　　　　　　　Patented June 14, 1887.

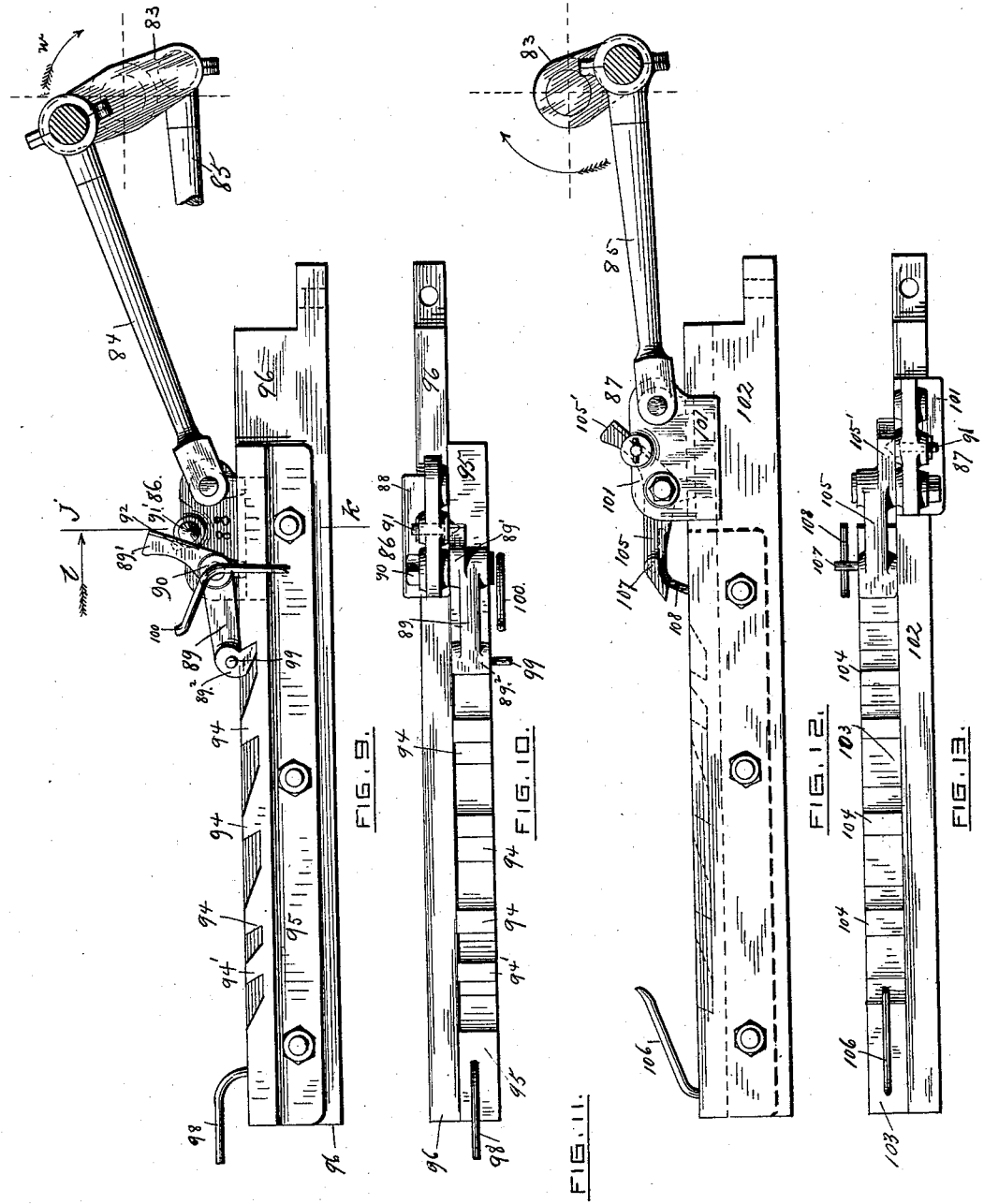

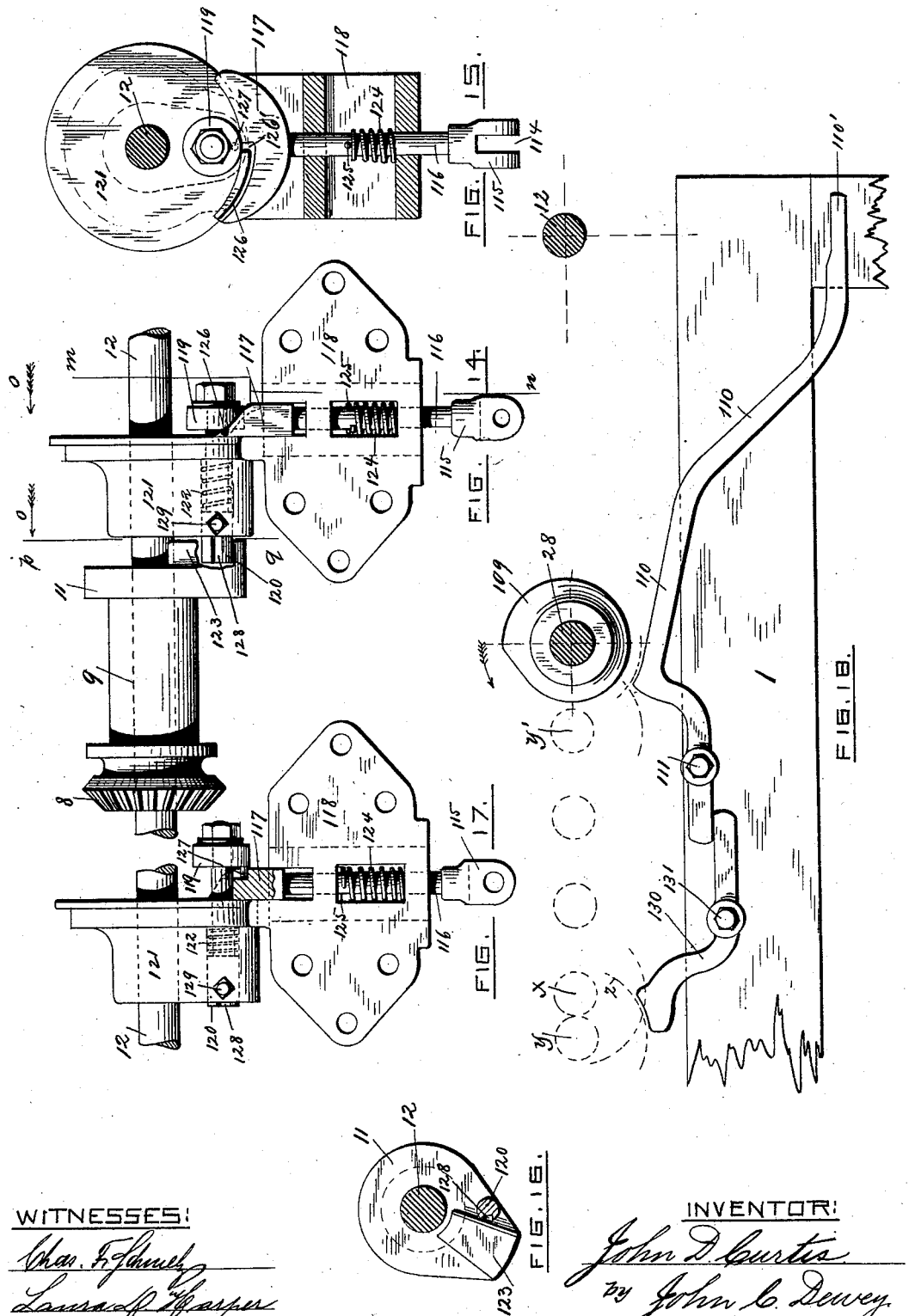

(No Model.) 9 Sheets—Sheet 8.
J. D. CURTIS.
MACHINE FOR MANUFACTURING BARB WIRE MESH FENCING.
No. 364,754. Patented June 14, 1887.
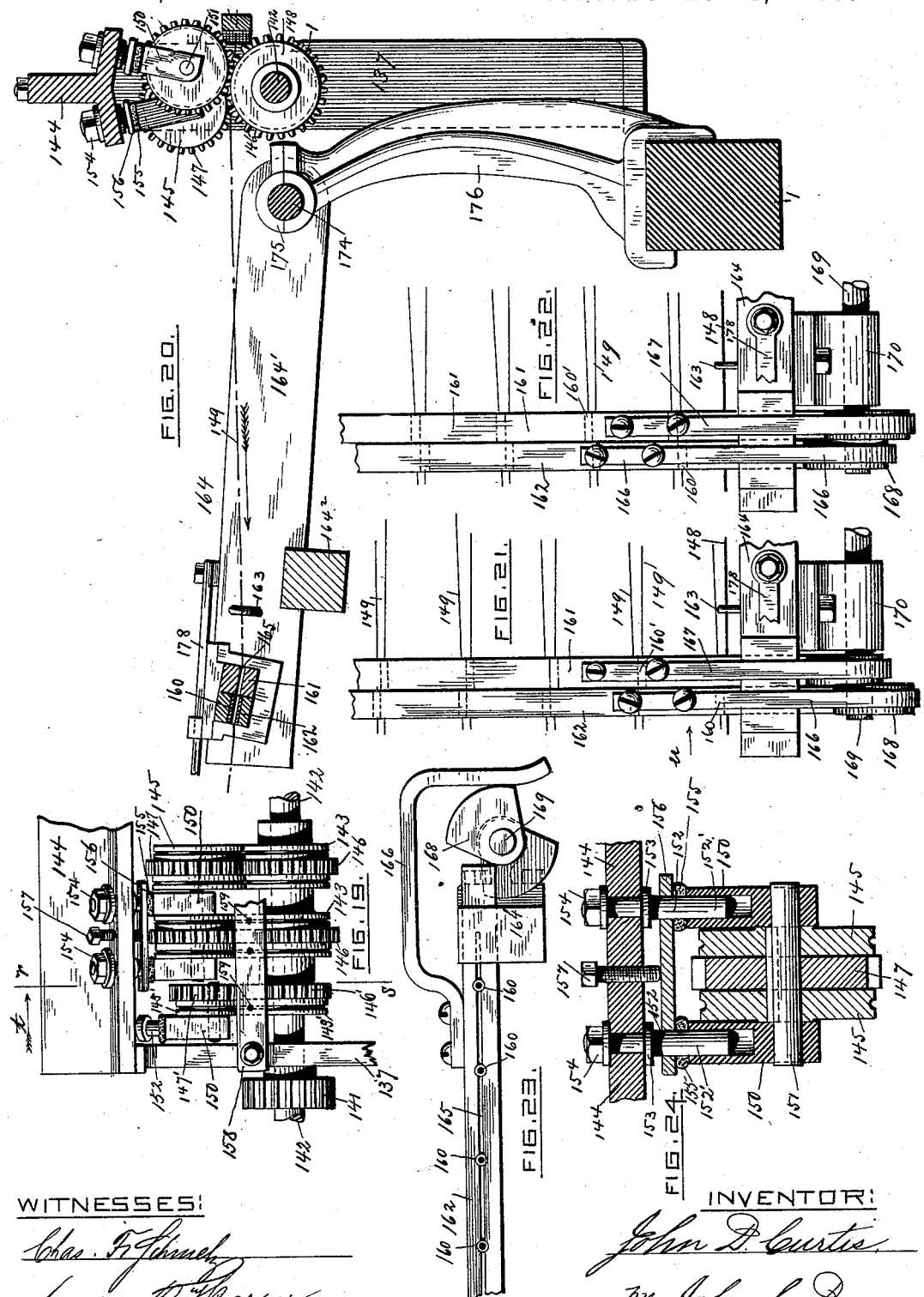
WITNESSES:
Chas. F. Schnell
Laura M. Harper
INVENTOR:
John D. Curtis
by John C. Dewey
Attorney.

(No Model.)
9 Sheets—Sheet 9.
J. D. CURTIS.
MACHINE FOR MANUFACTURING BARB WIRE MESH FENCING.
No. 364,754. Patented June 14, 1887.
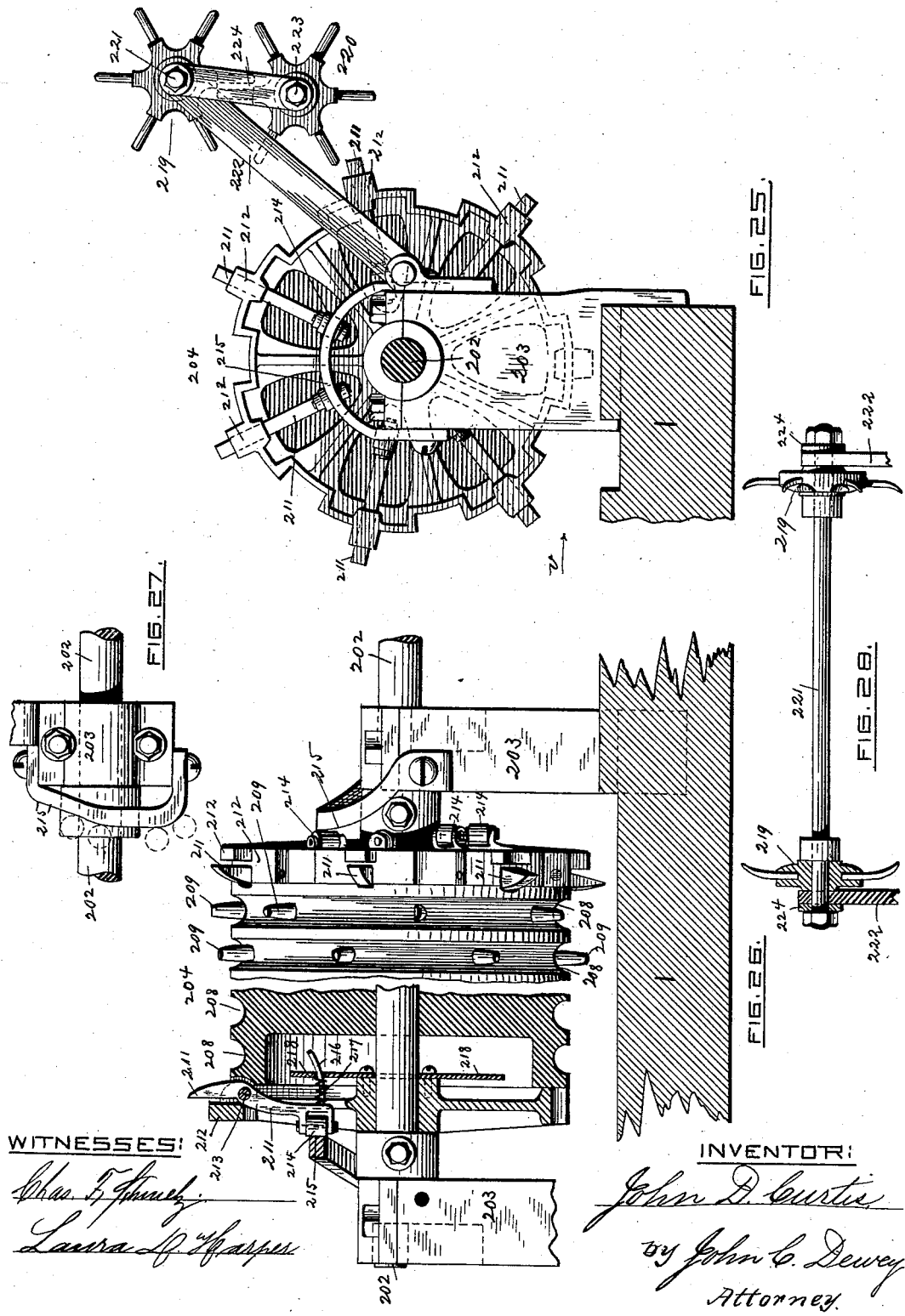
WITNESSES:
INVENTOR:
John D. Curtis
by John C. Dewey,
Attorney.

UNITED STATES PATENT OFFICE.

JOHN D. CURTIS, OF WORCESTER, MASSACHUSETTS.

MACHINE FOR MANUFACTURING BARB-WIRE MESH-FENCING.

SPECIFICATION forming part of Letters Patent No. 364,754, dated June 14, 1887.

Application filed February 21, 1887. Serial No. 228,292. (No model.)

*To all whom it may concern:*

Be it known that I, JOHN D. CURTIS, a citizen of the United States, residing at Worcester, in the county of Worcester and State of Massachusetts, have invented certain new and useful Improvements in Machines for Making Barb-Wire Mesh-Fencing; and I do hereby declare that the following is a full, clear, and exact description thereof, which, in connection with the drawings making a part of this specification, will enable others skilled in the art to which my invention belongs to make and use the same.

My invention relates to machines for automatically manufacturing barb-wire mesh-fencing, or wire mesh-fencing provided with barbs, of substantially the description set forth in my application for a patent, filed November 13, 1886.

My invention consists in certain novel features of construction, arrangement, and combination of the several parts of a machine for automatically making barb-wire mesh-fencing, as will be hereinafter fully described, and the nature thereof indicated by the claims.

I have sufficiently illustrated in the drawings, to enable those skilled in the art to understand the construction and operation thereof, a machine for automatically making barb-wire mesh-fencing of the description set forth in my said application for a patent, provided with diamond-shaped meshes and four pointed barbs secured upon the fencing at regular intervals at the points where the wires meet to form the meshes of the fencing.

Figure 2:
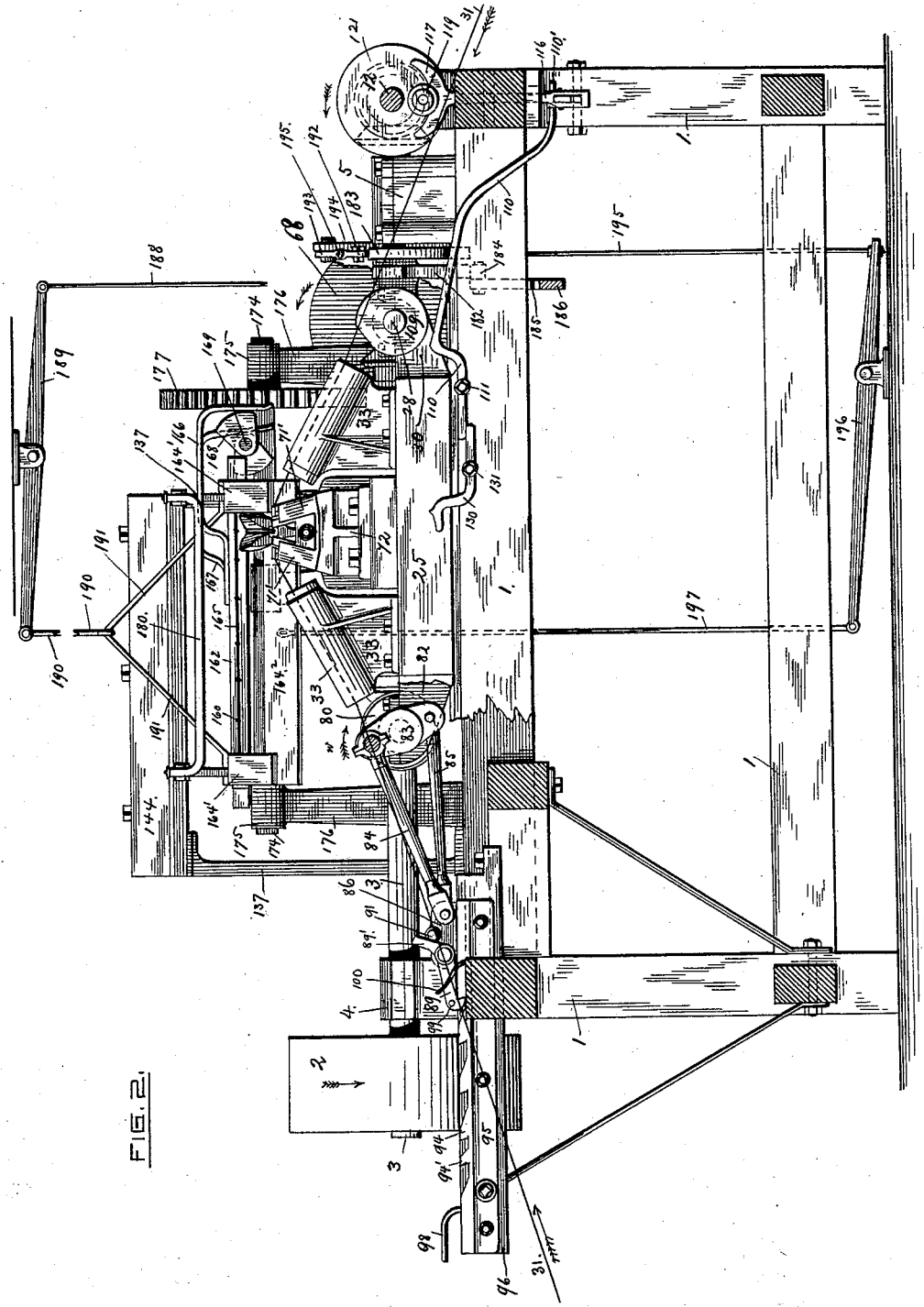
Figure 3:
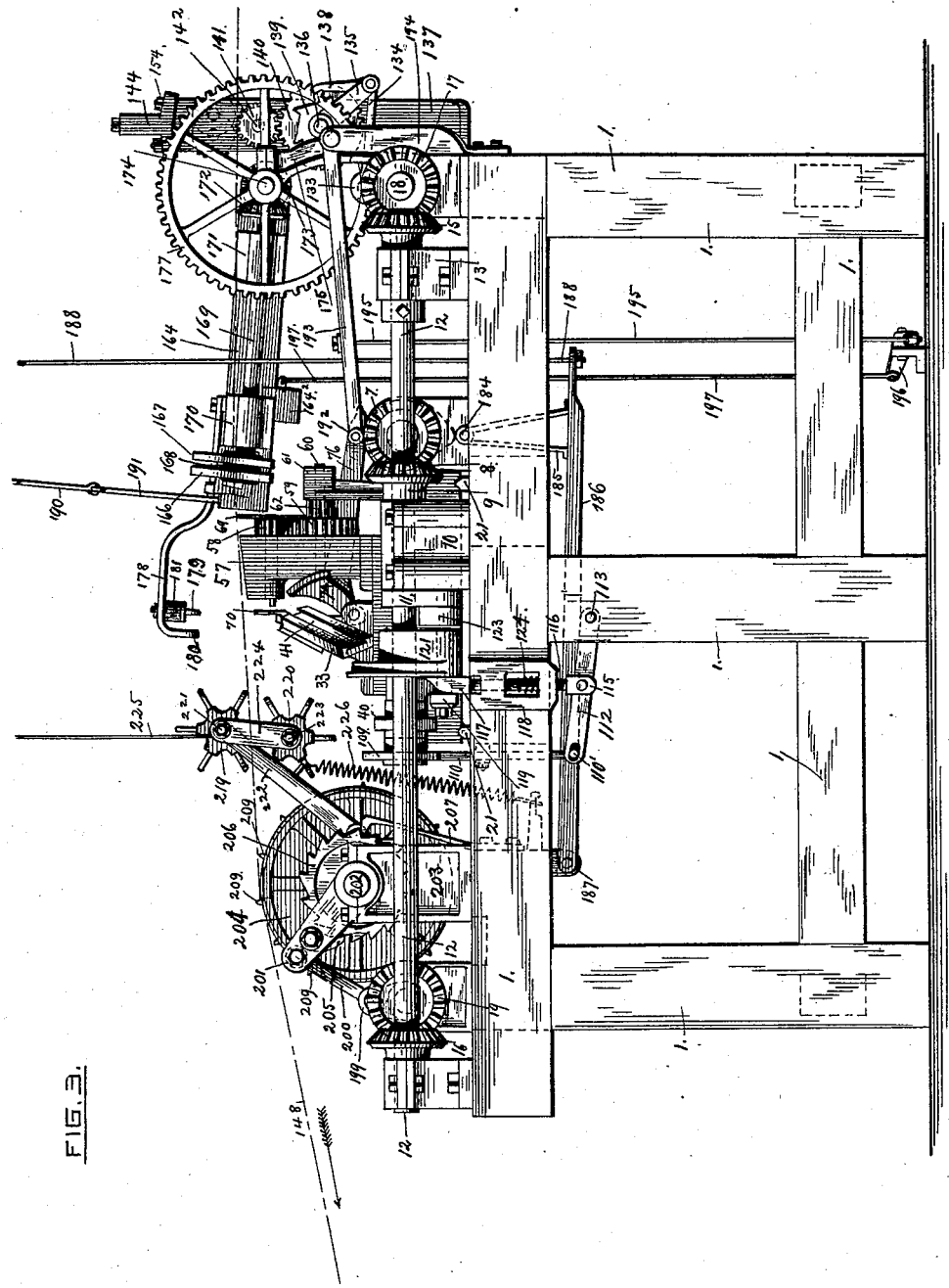
Figure 7:
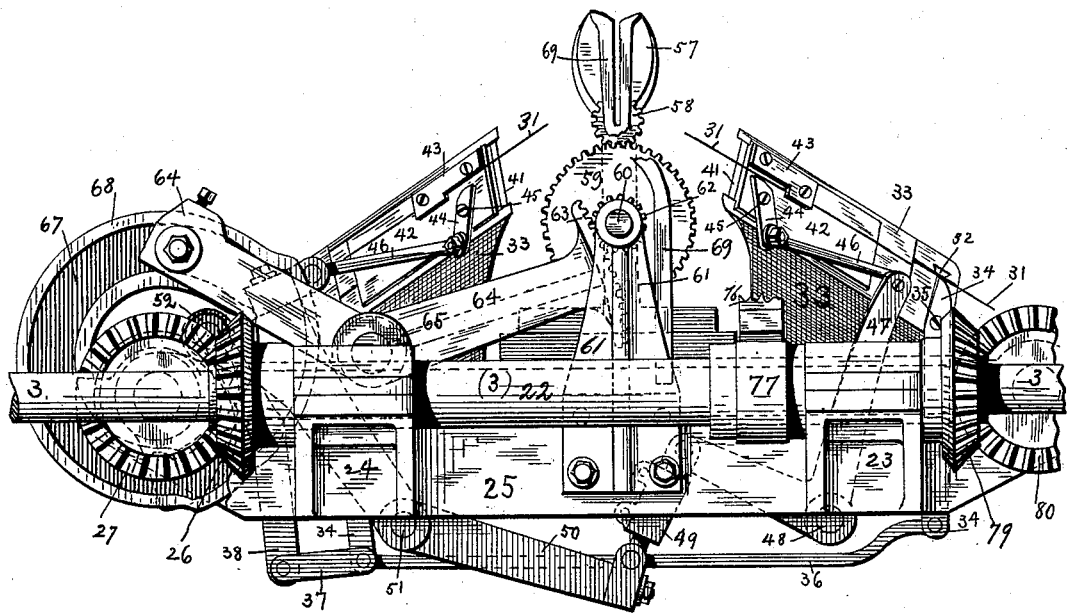
Figure 8:
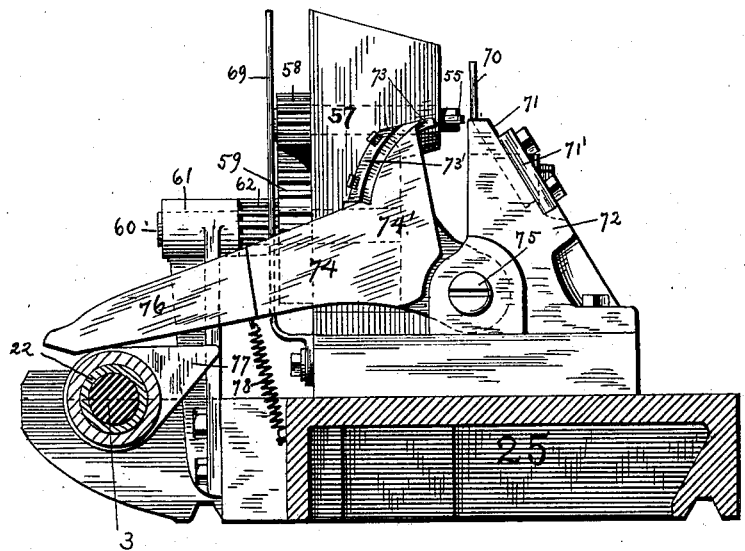

Referring to the drawings, Figure 1 is a plan view of the machine with some of the upper parts broken away, in order to prevent their hiding the lower mechanism. Fig. 2 is a vertical cross-section on line *a b*, Fig. 1, looking in the direction of arrow *c*, same figure—that is, from the front of the machine. Fig. 3 is a side elevation of the machine, looking in the direction of arrow *d*, Fig. 1. Figs. 4 to 8, inclusive, show, on an enlarged scale, details of the barbing-machine, viz: Fig. 4 is a plan or top view of the the barbing-machine. Fig. 5 is an enlarged view of the barbing-spindle detached. Fig. 6 is an end view of the spindle shown in Fig. 5, looking in the direction of arrow *e*, same figure. Fig. 7 is a rear elevation of the barbing-machine shown in Fig. 4, looking in the direction of arrow *f*, same figure; and Fig. 8 is a cross section on line *g h*, Fig. 4, looking in the direction of arrow *i*, same figure. Figs. 9 to 13, inclusive, represent, on an enlarged scale, detail views of the creepers or mechanism, which serves to move the barbing-machine back and forth on its tracks on the frame of the machine in the direction of the width of the fencing, viz: Fig. 9 is an elevation of the pulling-creeper. Fig. 10 is a plan view of the same. Fig. 11 is a section enlarged, taken on line *j k*, Fig. 9, looking in the direction of arrow *l*, same figure. Fig. 12 is an elevation of the pushing-creeper, and Fig. 13 is a plan view of the same. Figs. 14 to 18, inclusive, represent, on an enlarged scale, detail views of the clutch mechanism employed to throw into operation at the proper time the shafts of the mechanisms for feeding forward the main wires and for taking up the completed fencing, viz: Fig. 14 is a side elevation of the clutch proper with the shipping-fork in its lowest position. Fig. 15 is a section on line *m n*, Fig. 14, looking in the direction of arrow *o*, same figure. Fig. 16 is a section on line *p q*, Fig. 14, looking in the direction of arrow *o*, same figure, showing the engaging lug and pin. Fig. 17 is a view of the clutch shown in Fig. 14, detached, with the shipping-fork in its normal or highest position, the fork being shown in section in this figure and holding the sliding pin out of contact with the lug on the cam, shown in Figs. 14 and 16. Fig. 18 illustrates the levers employed to operate the shipping-fork and operated upon by the cam attached to a side shaft of the barbing-machine, to be hereinafter described. Fig. 19 shows, on an enlarged scale, a rear view of a portion of the feed-rolls between which the main wires of the fencing pass and are fed along. Fig. 20 is a vertical section taken on line *r s*, Fig. 19, looking in the direction of arrow *t*, same figure, showing the arrangement of the wire-guides supported in a vertical moving hinged frame and employed for bringing the main wires of the fencing into their proper positions as the barbs are applied thereto. Said guides are more especially shown in Figs. 21 and 22. Fig. 21 is a top view of said guides and connecting parts, showing their extreme positions in one direction; and Fig. 22 is also a top view of said guides, showing their extreme positions in the other direction. Fig. 23 is a front view of one of the guides shown in Fig. 21, looking in the direction of arrow $u$, same figure. Fig. 24 is an enlarged section taken longitudinally through the center of the upper pair of feed-rolls shown in in Fig. 19, illustrating the manner of supporting and adjusting said feed-rolls and their operating-gear. Figs. 25 to 28, inclusive, represent, on an enlarged scale, details of a modified form of the drum shown in Figs. 1 and 3 for taking up and feeding along the completed fencing. Fig. 25 is an end view of the take-up drum and guiding and spreading wheels. Fig. 26 is a partial section and elevation of the take-up drum shown in Fig. 25, looking in the direction of arrow $v$, same figure. Fig. 27 is a plan view of one of the bearings of the take-up drum, shown in Figs. 25 and 26, and the cam for operating the holding-jaws of said drum. Fig. 28 shows a plan view, partially in section, of the upper guide or spreading-wheel shown in Fig. 25.

I intend in practice to use the form of the take-up drum illustrated in Figs. 25 and 26 of the drawings, to be hereinafter fully described; but, for the sake of clearness in the drawings, I thought it best to represent a plain take-up drum in Figs. 1 and 3 of the drawings, which may be used, if preferred.

Similar figures of reference refer to similar parts in the drawings.

In the accompanying drawings, 1 is the frame of the machine, upon which is supported and secured all the operating mechanism, consisting of a series of shafting connected with each other by means of bevel-gears, as clearly shown in Fig. 1, and taking its movement from the driving-pulley 2, secured on the main shaft 3, turning in bearings 4 and 5, secured upon the frame 1, and on which the barbing-machine travels back and forth, as will be hereinafter fully described.

At the end of the main shaft 3 a bevel-gear, 7, meshes into and drives another bevel-gear, 8, which is attached to a sleeve, 9, supported loosely on shaft 12 and revolving simultaneously with the main shaft 3, and having a bearing, 10, which keeps the sleeve 9 in proper position. (See Fig. 1.) To the other end of sleeve 9 is secured the clutch-crank 11, the lug of which engages at the proper time a sliding pin supported in a disk keyed to the shaft 12, (see Fig. 14,) as will be hereinafter fully described.

It will be seen that the side shaft 12, turning in bearings 13 and 14, carries at its ends bevel-gears 15 and 16, the former of which, gear 15, meshes into the bevel-gear 17, secured upon the shaft 18, for operating the mechanism for feeding forward the main wires, while the latter, gear 16, meshes into gear 19, secured upon the shaft 20, for operating the take-up mechanism. Thus two distinct operations take place—first, the operation of the barbing-machine applying the barbs to the main wires, during which the side shaft 12 is stationary, the sleeve 9 revolving thereon; and, second, the operation of the mechanisms for feeding in the main wires and taking up the completed fencing after each row of barbs is applied, when the shaft 12 revolves, operated by the clutch mechanism, to be hereinafter described.

I will first proceed to describe the manner of construction and mode of operation of the barbing-machine or the mechanism for feeding in and applying the barbs to the main wires, and the parts connected therewith, including the mechanism for operating the barbing-machine and causing it to move back and forth upon the frame 1 in the direction of the width of the fencing in the process of applying the barbs thereto.

The mechanism for feeding in the barb-wires, coiling or wrapping them about the wires, and cutting them off, does not differ, essentially, from the mechanism employed in the ordinary form of machines now in general use for making barb-wire fencing of one strand; but some new features have been introduced, which will be fully described hereinafter.

The construction of the barbing-machine will be more readily understood by referring to Figs. 4 to 8, inclusive, of the drawings.

The barbing-machine 6 obtains its power from the main shaft 3, and its sleeve 22 is adapted to slide thereon back and forth, the barbing-machine being supported upon and traveling on ways or tracks 21, secured upon the frame of the machine. (See Fig. 1.) To this end the sleeve 22 is provided with a key-slot and mounted on the main shaft 3 in such a way as to cause said sleeve to revolve with said shaft, and at the same time to allow of its sliding back and forth thereon as the barbing-machine travels back and forth. The sleeve 22 has bearings 23 and 24 secured to the bed 25 of the barbing-machine 6, and has at one end a bevel-gear, 26, secured thereon, which meshes into a bevel-gear, 27, secured upon one end of the shaft 28, which is supported and turns in bearings 29 and 30, bolted or cast upon the bed 25 of the barbing-machine. (See Fig. 4.) Said shaft 28 carries the cams for operating the mechanism for feeding the barb-wires to the coiling-spindle, the mechanism for clamping and holding the barb-wires, and the mechanism for operating the coiling-spindle, all in due order. Upon the sleeve 22 on the shaft 3 is secured the cam 77 for operating the mechanism for cutting off the barb-wires after the same have been coiled around the main wires, as will be hereinafter described.

I will first describe the mechanism for feeding in the two barb-wires on opposite sides of the coiling-spindle, and which is most clearly illustrated in Fig. 7, which is a rear view of the barbing-machine, looking in the direction of arrow $f$, Fig. 4.

The two feeding mechanisms for the two barb-wires, one on each side of the coiling-spindle, are substantially alike, so a description of one will answer for both. Taking the one on the right, Fig. 7, the barb-wire 31 is firmly held against the plate 32 of the casting 33, bolted to the bed 25 of the barbing-machine (see Fig. 4) by means of the grip-lever 34, which is pivoted at 35 to the casting 33. The lower end of said lever 34 is connected by a rod, 36, with the lower end of the corresponding grip-lever, 34, on the other side of the coiling-spindle, for holding the barb-wire on that side, said lever being similarly pivoted on the casting 33 on that side. Both grip-levers 34 are so arranged that they are operating at the same time and in the same manner. Power is obtained for operating said levers 34 through the link 37, connecting with the lower end of the lever 38, which is centrally pivoted to the bed 25 of the barbing-machine and carries at its upper end a roll, 39, which is acted upon at the proper time by the cam 40 upon the shaft 28. (See Fig. 4.)

In the upper portion of the casting 33 of the barb-wire-feeding mechanism are dovetail grooves 41, adapted to receive and support the slide 42. Said slide 42 is provided at its upper end with a cap-piece, 43, having a slot or groove in its lower part, through which the barb-wire passes. (See Fig. 7.) The upper end of the pawl 44, pivoted at 45 on the slide 42, is adapted to press against the wire extending through the slot in the cap-piece 43 and bind it between said cap-piece and the end of the pawl 44 when the barb-wire is being fed to the coiling-spindle. The barb-wire, being clamped between the under side of the cap-piece 43 and the upper end of the pawl 44, (clearly shown in Fig. 7,) will act as a stop to the further movement of said pawl and cause the slide 42 to move forward in its supporting-casting 33 toward the coiling-spindle, thus feeding the barb-wire to said spindle, the grip-lever 34, hereinbefore described, being opened during this operation to allow of the barb-wire being freely fed forward. When the desired length of barb-wire has been fed to the coiling-spindle, the grip-lever 34 is operated, in the manner above described, to clamp and hold the barb-wire in connection with the stationary plate 32, while the slide 42 and the pawl 44, pivoted thereon, return to their normal positions, drawn back by the mechanism connected with and for operating said pawl 44, and to be hereinafter described. The lower end of the pawl 44 is connected by a rod, 46, with one arm of the angle or bell-crank lever 47, which is pivoted at 48 to the bed 25 of the barbing-machine. (See Figs. 4 and 7.) The other arm of the angle-lever 47 is connected by a link, 49, with one arm of an angle-lever, 50, pivoted at 51 to the bed 25. The other arm of said angle-lever 50 is directly connected with the rod 46 of the pawl 44 on the slide 42 of the left-hand barb-wire-feed mechanism. (See Fig. 7.) A roll, 52, is also supported in the upper end of angle-lever 50, which is operated upon by the cam 53, secured upon the side shaft 28 of the barbing-machine. (See Fig. 4.) It will thus be seen that the cam 53 operates simultaneously at the proper time, the mechanisms for feeding forward the barb-wires located upon the opposite sides of the coiling-spindle.

When the barb-wires 31 are fed to the coiling-spindle 54 by the barb-feeding mechanisms above described, they pass between the two coiling-fingers 55 formed upon the forward end of said spindle 54, (see Fig. 5,) and which are in a vertical position as the barb-wires are fed in; and said barb-wires are wrapped or coiled around two main wires of the fencing which have been placed in the longitudinal slot 56, extending the whole length of the coiling-spindle 54. (See Figs. 5 and 6.)

The coiling-spindle 54 is supported and has its bearing in the stand 57, bolted to the bed 25 of the barbing-machine and extending up therefrom, as shown in Figs. 3, 7, and 8.

The spindle stand 57 is made hopper-shaped on top for the purpose of guiding the two main wires to be united by the barb-wire into the slot 56 of the coiling-spindle 54, and I have found it advantageous in practice to form the rear end of the hopper-shaped spindle-stand 57 so as to bring the wires together first at that point, and upon their further entering the hopper they are gradually laid side by side until they enter the longitudinal slot 56 in the coiling-spindle 54 together.

Upon the rear end of the coiling-spindle 54 is formed or secured a gear, 58, which meshes into and is operated by a gear, 59, secured on a shaft, 60, having its bearings in the bracket 61, bolted to the bed 25 of the barbing-machine, and also in the spindle-stand 57. (See Fig. 8.) A pinion, 62, is also secured upon said shaft 60, and is operated by the sector-gear 63 on one arm of the angle-lever 64, pivoted in bearings 65 on the bed-plate 25 of the barbing-machine. (See Fig. 4.) The other arm of the angle-lever 64 is provided with a roll, 66, which engages with and travels in a groove, 67, made in the side of the cam 68, secured upon the side shaft 28 of the barbing-machine. (See Figs. 4 and 7.) The revolution of the cam 68 causes a rocking motion of the angle-lever 64, and causes the coiling-spindle 54, through the intervention of the sector-gear 63, pinion 62, gear 59, and gear 58, to be revolved first in one direction and then in the other, to wrap or coil the barb-wire around the main wires.

An upright guide, 69, with a forked upper end is secured at the rear of the coiling-spindle 54, (see Fig. 8,) which serves to guide the main wires into the longitudinal slot 56 of the coiling-spindle in connection with the hopper-shaped spindle-stand 57. Said guide 69 also acts as a spring to push the coiling-spindle 54 forward and into its proper place after it has moved back longitudinally in the act of coiling on the barb-wire. An upright forked guide, 70, is also secured at the front of the coiling-spindle 54, to act as a guide for directing the two main wires to be barbed into the longitudinal slot in said spindle. (See Fig. 8.)

The operation of applying the barb-wire to the main wires is as follows: The two main wires to be united are brought together into the hopper shaped spindle-stand 57, in the manner to be hereinafter described, and enter into the longitudinal slot 56 in the coiling-spindle 54, which is in the proper position to receive them. The operating-cam 68 revolves with said shaft 28, and a variation in said cam will cause the coiling-spindle 54 to revolve one-quarter of a revolution, thus bringing the coiling-fingers 55 into a vertical position, one above the other, so that the barb wires 31 can be fed in between said fingers 55 on each side of the coiling-spindle. The barb-wires having been fed in the proper distance by the feeding mechanism, hereinbefore described, and the grip-levers 34 firmly holding the barb-wires, another variation in the operating-cam 68 will cause the coiling-spindle 54 to revolve the necessary number of times, in the manner above described, to coil or wrap the free ends of the barb-wires around the two main wires at the point where they are held together at the forward end of the coiling-spindle. After the barb-wires are coiled around the main wires, the mechanism for cutting off the barb-wires is brought into operation, after which the operating-cam 68 (continuing to revolve) causes the coiling-spindle 54 to be returned to its original position and allows the main wires, with a four-pointed barb applied thereto, to be raised out of the spindle-stand 57, in the manner to be hereinafter described, preparatory to the applying of another barb on the next two main wires.

I will now describe the mechanism for cutting off the barb-wires after the same have been coiled around the main wires. Said mechanism is most clearly illustrated in Figs. 4 and 8.

Two stationary cutter-blades, 71, are supported upon and secured to the casting or stand 72, secured upon the bed-frame 25 directly in front of the coiling-spindle 54 by holding-plates 71', bolted to said stand 72. The cutting-edges of the stationary cutter-blades 71 extend out upon opposite sides of the coiling-spindle 54, (see Fig. 4,) and just below the center of said spindle. (See Fig. 8.) Two movable cutter-blades, 73, are supported upon and secured by bolted holding-plates 73' to the two projections or cheeks 74' of the pivoted casting 74, which is supported below the coiling-spindle 54 and turns or rocks on two centers, 75, extending through rearward projections of the casting 72. (See Figs. 1, 4, and 8.) The two projections 74' of the rocking casting 74, carrying the movable cutter-blades 73, extend up on opposite sides of the spindle-stand 57, so that the cutting-edges of the cutter-blades 73 will extend out on opposite sides of the coiling-spindle 54 in a plane below the coiling-spindle, and be adapted to act against the cutting-edges of the stationary cutters 71, above described, to cut off the barb-wires extending between said cutters as the pivoted casting 72 is rocked or tilted forward, in the manner to be hereinafter described. After the movable cutter-blades 73 have acted, the casting 72 returns to its normal position, causing the cutters 73 to move back and drop down out of the way of the fencing, passing over said cutters. From the rear part of the pivoted casting 74, carrying the cutters 73 on one side thereof, an arm, 76, extends, which is adapted to engage and be acted upon by the cam 77, supported upon the main shaft 3, as hereinbefore described. The revolution of the cam 77 causes the arm 76 to be raised at the proper time and the pivoted casting 74 to be rocked, causing the cutters 73, secured thereon, to be moved forward with said casting and act against the stationary cutters 71, and thus cut off the barb-wires extending between them. A spring, 78, may be attached to the arm 76 of the pivoted casting 74 and to the bed 25 of the barbing-machine to keep the arm 76 in contact with its operating-cam 77.

I will now describe the mechanism which causes the barbing-machine to move back and forth upon the bed 1 in the process of applying the rows of barbs to the main wires, which mechanism is most clearly illustrated in Figs. 1, 2, 4, and 9 to 13, inclusive.

Referring to said figures above mentioned, and looking from the front of the barbing-machine 6, Fig. 4, it will be seen that on the left side a bevel-gear, 79, is secured upon the sleeve 22 of the barbing-machine. (See Fig. 4.) Said gear 79 meshes into a bevel-gear, 80, secured upon a side shaft 81 turning in bearings 82, secured upon the bed 25 of the barbing-machine. The object of the shaft 81, driven by the bevel-gear 79 upon the sleeve 22, is to cause the barbing-machine to be moved back and forth upon its tracks 21 in the process of applying the barbs to the main wires, and for this purpose a double crank, 83, is secured to the side shaft, 81, and interposed between the bearings 82, and connected by means of rods 84 and 85 with what I term "creepers" 86 and 87, the former of which, 86, as the side shaft 81 and double crank 83 thereon revolve, acts to draw the barbing-machine along on its tracks 21 from right to left, and the latter, 87, to push the barbing-machine in the opposite direction from left to right. In Figs. 9 to 13, inclusive, are shown detail views of the creepers 86 and 87 and connecting mechanisms for moving the barbing-machine back and forth on the bed 1 of the machine. The pulling mechanism consists of a sliding carriage, 88, and a hook, 89, pivoted thereon at 90 and provided with an upward extension, 89', adapted to swing in front of a spring-actuated pin, 91. (See Figs. 9 and 10.) The spring-actuated pin 91 is supported in the upper part of the sliding carriage 88. (See detail view, Fig. 11.) It has an enlarged pointed head, 91', extending out slightly beyond the side surface of said carriage. A coiled spring, 93, encircles said pin 91, bearing at one end against its enlarged head 91' and at the other end against the casting, bored out to receive it. A check-pin, 93', extends through the rear end of said pin 91 and has its bearing against the opposite side of the carriage 88 from the head 91' of said pin 91. The check-pin 93' prevents the pin 91 from being forced out too far by the spring 93. The pointed head 91' of the pin 91 enters into a hole, 92, (see dotted lines, Fig. 9,) in the extension 89' of the head 89 when the said hook 89 is raised up, (in the manner to be hereinafter described,) and the actuating-spring 93 of said pin 91 is strong enough to keep said pin 91 in the hole 92 of the extension 89' and hold the hook 89 during the return of the barbing-machine in an elevated position and out of engagement with the teeth 94 of the rack 95. The rack 95 is bolted to or made a part of the way or track 96, upon which the carriage 88 slides back and forth. Said rack and way are secured to the frame 1 of the machine on the left-hand side. (See Figs. 1 and 2.)

The teeth 94 in the rack 95 are so arranged as to cause the spindle stand 57 and coiling-spindle 54, supported upon the bed of the barbing-machine, to come directly underneath the two main wires upon which the barb is to be applied at each side movement of the barbing-machine.

The side shaft 81, carrying the double crank 83, revolves in the direction of arrow $w$, Fig. 9, and the rack 95, being stationary, the barbing-machine 6 is drawn on its tracks 21 from right to left, for at each revolution of the double crank 83 the lower end, 89'', of the pivoted hook 89 on the sliding carriage or creeper 88 catches into the teeth 94 and draws the barbing-machine along. After the last tooth 94' has performed its office, the next revolution of the double crank 83 will push the sliding carriage 86 far enough along on its track 96 to cause the lower end, 89'', of the pivoted hook 89 to ride up on the bent wire 98, secured at the outer end of the rack 95, (see Figs. 9 and 10,) until the extension 89' is depressed sufficiently to allow the point 91' of the spring-actuated pin 91 to enter into the hole 92 in said extension, and hold the hook 89 in an elevated position and out of contact with the teeth 94 as the barbing-machine is moved back in the opposite direction by means of the pushing-creeper 87, to be hereinafter described. When the barbing-machine reaches its farthest position on the right, being pushed over from left to right, the pin 99, projecting out from the lower end, 89'', of the hook 89, will come in contact with the under side of the bent wire 100, secured at the side of the rack 95, and cause the hook 89 to be depressed and the extension 89' to be disengaged from the pin 91, allowing the lower end, 89'', of the hook 89 to catch in the teeth 94 and operate to draw the barbing-machine from right to left, as above described.

The pushing-creeper 87, Figs. 12 and 13, is constructed and operated substantially the same as the pulling creeper 86, above described.

A sliding carriage, 101, is supported and slides back and forth upon a track, 102, to which is bolted a rack, 103, provided with teeth 104, said track and rack being supported and secured on the bed 1 parallel to the track 96 and rack 95, above described. The teeth 104 are arranged to bring the barbing-machine in its proper position relative to the main wires during the process of applying the barbs, as described, in connection with teeth 94 of the rack 95. Upon the sliding carriage 101 is pivoted a pawl, 105, having an extension, 105', at its upper end, provided with a hole adapted to engage with the pointed head 91' of a spring-actuated pin 91, supported on the carriage 101, when the pawl 105 is not in use, in the same manner as described above in connection with the hook 89 on the sliding carriage 88. As the barbing-machine reaches its extreme position on the left, drawn over by the pulling-creeper 86, as above described, the lower end of the pawl 105, which has been held in an elevated position and out of contact with the teeth 104, is depressed by coming in contact with the curved wire 106, secured at the outer end of the rack 103, and the extension 105' is disengaged from the pin 91, and, as the double crank 83 continues to revolve in the direction of the arrow, Fig. 10, the end of the pawl 105 catches in the teeth 104 and operates to push the barbing-machine back from left to right. When the barbing-machine reaches its extreme position on the right, the pin 107, extending out from the lower end of the pawl 105, comes in contact with and rides up on the curved wire 108, secured at the side of the rack 103, (see Fig. 13,) causing the pin 91 to engage with the hole in the extension 105' of the pawl 105, and hold said pawl in an elevated position during the return-trip of the barbing-machine.

By means of the pulling and pushing creepers 86 and 87, above described, operated by the double crank 83 on the side shaft 81 through the intervention of the connecting-rods 84 and 85, the barbing-machine is continually moved back and forth, or from side to side, on the frame 1 of the machine as long as the machine operates, passing under the main wires of the fencing upon which the barbs are to be applied, and stopping long enough at regular intervals as the double crank 83 revolves to allow of the barbs being applied to the main wires. At the completion of each row of barbs applied to the main wires the main wires are fed forward longitudinally through the machine from the rear, and the take-up drum at the front of the machine is operated to draw along the completed fencing, which is reeled or wound upon a spool of ordinary construction. (Not shown in the drawings.)

I will now describe the mechanism for operating at the proper time the feeding mechanism. (See Figs. 1, 2, 3, and 14 to 18, inclusive.) This operation is performed by throwing a clutch, to be hereinafter described, into operation, which results in setting in motion the side shaft 12, and, through the bevel-gears 15 and 17 at the rear of said shaft, the shaft 18 of the feeding mechanism, to be hereinafter described, as also, through the bevel-gears 16 and 19 at the forward end of said shaft 12, the shaft 20 of the take-up mechanism, to be hereinafter described.

At the forward end of the side shaft 28 of the barbing-machine 6, on the right of said machine, is secured a cam, 109, (see Figs. 2 and 18,) which is constructed so as to strike against a lever, 110, pivoted at 111 to the frame 1 of the machine. The outer end, 110', of said lever 110 is connected with one end of a lever, 112, the other end of which lever is pivoted at 113 to the frame 1 of the machine. (See Fig. 3.) The lever 112 passes through and is pivoted in the slot 114 of the head 115, attached to the lower end of the vertical sliding rod 116, which is provided with a crescent-shaped piece or fork, 117, at its upper end. (See Fig. 15.) The forked rod 116 is supported and has bearings in a bracket or casting, 118, screwed to the inside of the frame 1 and having its central part extending through the frame and located directly below the shaft 12. (See Fig. 3.)

The upper edge of the fork 117 is made beveled upon its outer side, (see Figs. 3 and 14,) so as to force the head 119 of the horizontal sliding pin 120, supported in the disk 121, out from said disk 121, secured upon the shaft 12, against the action of the spring 122, encircling said pin, and hold said pin 120 out of contact with the lug 123 on the clutch-crank 11, secured to sleeve 9 loose on the shaft 12.

In order to keep the fork 117 of the vertical sliding rod 116 pressed up against the head 119 of the sliding pin 120, to hold the same out, as indicated in Fig. 17, a strong spiral spring, 124, encircling the rod 116, is made use of, one end of which bears against the lower part of the bracket or casting 118 and the upper end against a pin, or studs 125, projecting out from the rod 116. (See Fig. 15.)

It will be understood that when the forked rod 116 is pulled down by the action of the lever 110, the spring 122, encircling the driving-pin 120 and retained within the opening in the disk 121, will force said pin 120 out of the disk 121 and cause it to come in contact with the lug 123 on the clutch-crank 11 of the sleeve 9, (see Fig. 14,) which is loose upon the shaft 12 but revolving continually through the bevel-gears 7 and 8, the former being upon the main shaft 3. Thus the side shaft 12 and shafts connected therewith will be put into motion and will continue to revolve until one revolution is completed, when the forked rod 116, which has been released and returned to its normal position, will operate to disconnect the driving-pin 120 and hold it out of contact with the clutch-crank 11 until the barbing-machine has completed another row of barbs, when the clutch mechanism will be again operated and the pin 120 be released and the feeding mechanism and take-up mechanism be again operated through the revolution of the shaft 12.

I have found it advantageous in practice to provide some means for securely holding the forked rod 116 in its upward position, so as to prevent its being pushed downward by the driving-pin 120 when it first strikes it. In this instance I have made a groove, 126, Fig. 15, upon the upper surface of the fork 117, and so arranged said groove that a pin, 127, on the inside of the head 119 of the pin 120 may enter and travel along in said groove (see Fig. 17) and hold the fork 118 up in its position until the sliding pin 120 is drawn out of engagement with the lug 123 on the clutch-crank 11, when the disk 121 and shaft 12 will cease revolving.

As shown in Fig. 15, a passage, 126', is left from the groove 126 to the top of the fork 117, so that the pin 127 may pass out of the groove 126 and the fork 117 be drawn down at the proper time.

In order to keep the pin 127 projecting out from the head 119 of the sliding pin 120 in proper position so that it will enter the groove 126 in the fork 117 as the disk 121 revolves with the shaft 12, the sliding pin 120 may be made square, or, when round, as illustrated in the drawings, provided with a longitudinal groove, 128, into which extends a set-screw, 129, supported in the disk 121. (See Figs. 14 and 17.)

Having thus described the manner of construction and mode of operation of the clutch mechanism for putting in operation the side shaft 12 to operate the shafts 18 and 20 of the feeding and take-up mechanisms, I will now describe how said clutch mechanism is operated at the proper time.

As before stated, a cam, 109, is secured upon the end of the said shaft 28 of the barbing-machine 6, adapted to operate the lever 110 and the clutch mechanism, above described, through the intervention of the connecting-lever 112. (See Figs. 3 and 18.)

In Fig. 18 I have shown by dotted lines the positions which the cam 109 will assume during the travel of the barbing-machine from right to left in the process of applying one row of barbs to the main wires. As illustrated, the cam 109 is just starting on its course, revolving in the direction of the arrow with the shaft 28, which revolves continually. The cam 109 is so arranged that it will not operate the lever 110 until it has advanced to the last position but one, when, during its rotation at that point, x, it will come in contact with the projection on the outer end of the secondary lever 130, pivoted at 131 to the frame 1, and, having its inner end in contact with the short arm of the lever 110, thereby depressing the outer end of said lever 110 and causing the clutch mechanism connected therewith to be operated, and the shaft 12, and also the shafts 18 and 20 of the feeding and take-up mechanisms, to be operated, as hereinbefore described.

The barbing-machine continues to travel to the left a distance equal to one-half of the previous distances, (see tooth 94' of rack 95, Figs. 9 and 10,) when the cam 109, rotating at the point $y$, will clear the lever 130. (See dotted line $z$, Fig. 18.) On the return-trip of the barbing-machine from left to right the first distance to be traveled will be a full distance, (see outer tooth 104 of rack 103, Figs. 12 and 13,) so that the point of rotation of the cam 109 will be beyond the point $x$, and thus the cam 109 will clear the lever 130 on its return-trip, but will strike the upward-projecting part of the lever 110 when said cam has reached its last position but one to the right, thus operating the clutch mechanism and allowing the feeding and take-up mechanisms to be again operated. The barbing-machine continues to travel to the right after the cam 109 has operated the lever 110 a distance equal to one-half of the previous distance, (see the inner tooth 104 of rack 103, Figs. 12 and 13,) when the cam 109, rotating at this point, (which is where the cam is shown at the right, Fig. 18,) will clear the lever 110. The barbing-machine returning and traveling again from right to left, the first distance traveled is a full distance, (see inner tooth 94 of rack 95, Figs. 9 and 10,) so that the point of rotation of the cam 109 will be at $y'$, Fig. 18, and the cam 109 will clear the lever 110; but it will operate the secondary lever 130 upon its return-trip, as above described, and cause the clutch mechanism to be again operated. It will thus be seen that after each row of barbs is applied to the main wires by the barbing-machine traveling from side to side of the machine, the cam 109 operates the clutch mechanism and allows the feeding and take-up mechanisms to be operated.

I will now describe the mechanism at the rear of the machine for feeding the main wires into the machine, and which is operated by the side shaft 12 at the proper time. Upon the rear end of the shaft 12 is secured a bevel-gear, 15, which meshes into a beveled gear, 17, secured on the shaft 18 of the feeding mechanism. (See Figs. 1 and 3.) Said shaft 18 turns in bearings 132, secured upon the frame 1. Upon the opposite end of the shaft 18 from the gear 17 is secured a crank, 133, which is connected by a rod, 134, with the outer end of the arm 135, the inner end of said arm is pivotally supported on a shaft, 136, supported in a stand or frame, 137, secured to the frame 1 at the rear of the machine. (See Fig. 3.) To the outer end of the arm 135 is also hinged a pawl or hook, 138, adapted to engage and operate a ratchet-wheel, 139, secured upon the shaft 136. Said shaft 136 also carries a gear, 140, meshing with a gear, 141, secured upon the shaft 142 of the lower set of feed-rolls, 143. Said shaft 142 of the lower feed-rolls, 143, is supported in the stands or frames 137 at the rear of the barbing-machine.

In Figs. 19, 20, and 24 I have shown detail views of the arrangement and construction of the upper and lower sets of feed-rolls, which are placed and supported between the two stands or frames 137, which are held together at their upper ends by a bar, 144, which supports the upper sets of feed-rolls, 145. Nearest the stands 137, on each side, are the smaller feed-rolls, 145' and 143', which are rotated by smaller gears, 146' and 147', the lower gear, 146', being secured upon the shaft 142. The object of said smaller feed-rolls, 145' and 143', at each side of the machine is to feed in the outside or selvage wires 148. The sets of larger feed-rolls, 145 and 143, located between said outside feed-rolls, 145' and 143', and operated by the gears 146 and 147, are to feed in the central wires, 149, between the selvage-wires 148. In order to gain room and to bring the main wires into proper and uniform positions, the upper feed-rolls, 145, and operating-gears 147 are staggered, as indicated in Fig. 20, while the lower feed-rolls, 143, and operating-gears 146 are secured upon the shaft 142, the end of which carries the gear 141, driven by the gear 140 on the shaft 136, as above described. The upper feed-rolls, 145, are adjustably held in hangers 150, so that more or less pressure may be brought upon the wires to feed them along. In Fig. 24 a detached pair of upper feed-rolls, 145, is shown in section. The hangers 150 support a shaft, 151, in their lower ends, upon which are secured the pair of feed-rolls 145 and the operating-gear 147, which meshes with and is driven by the lower gear, 146, secured upon the shaft 142. (See Fig. 19.) The upper ends of the hangers 150 are bored out to receive the lower ends, 152', of the bolts 152, which are provided with shoulders 153, bearing against the under side of the supporting-bar 144, and nuts 154 are screwed upon the upper ends of the bolts 152, securely holding said bolts in place, and attached to the cross-bar 144. The bolts 152 are thus made guides for the hangers 150. Upon the upper end of each hanger 150 a piece of rubber or other pliable material, 155, is placed, held in position by the bolts 152 passing through the same, and a bar, 156, rests and has its bearing upon said yielding washers 155, and is held down upon them and the pressure thereon adjusted by means of a screw, 157, supported and turning up and down in a threaded hole in the cross-bar 144. (See Fig. 24.) By this manner of construction of the supporting mechanism of the upper feed-rolls more or less friction may be obtained between the upper and lower feed-rolls, while at the same time any kink or unevenness in the wires passing between said feed-rolls will not break or injure any part of the feeding mechanism on account of the yielding washers 155.

The feed-rolls 143 and 145 for feeding in the central wires, 149, are made larger than the feed-rolls 143' and 145' at each side for feeding in the selvage-wires 148, for the reason that the selvage-wires 148 are kept in a straight line during the process of manufacturing the fencing, while the central wires, 149, follow a serpentine course to form the diamond-shaped meshes, which necessitates a larger stretch of the central wires to be fed in at each feeding operation. At the rear of the feed-rolls a guide-bar, 158, is bolted to the stands 137, and provided with guide holes 159 for the main wires to pass through and be guided directly between the feed-rolls, which are properly grooved to receive the wires. (See Fig. 19.) The use of the bar 158 is not essential, and it may be dispensed with.

I will now describe the mechanism for shifting or bringing two of the main wires together at the proper time as they are fed through the machine to have a barb applied thereto. Detail views of said mechanism are shown in Figs. 20 to 23, inclusive. The main wires are taken from delivery reels or spools properly arranged and supported at the rear of the machine in any ordinary manner, (not shown in the drawings,) and are passed through the guide-holes 159 in the guide bar 158 at the rear of the feeding mechanism and between the upper and lower sets of feed-rolls, 145 and 143, and then the central wires, 149, are passed through eyes or bushings 160 and 160' alternately, provided in two parallel sliding guide-bars, 161 and 162, supported on a vertical swinging frame, 164, to be hereinafter described, so that the bushing 160 for the first central wire, 149, (see Fig. 21 at the right,) is placed in the front guide-bar, 162, and the bushing 160' for the second central wire, 149, in the rear guide-bar, 161, and so on, alternately, until all the central wires, 149, are taken care of. It will be understood that no side motion is given to the two selvage wires 148. They are simply supported in the guide-bars 161 and 162 and held in their proper position by a hook or eye, 163, secured in the swinging frame 164, supporting said guide-bars. The central wires, 149, next to the selvage wires are drawn up to the selvage wires at the proper time to be connected therewith by a barb and form the mesh, as shown in Fig. 1. The sliding guide-bars 161 and 162 have each central longitudinal slots, 165, extending almost their whole length, and uninterruptedly, except at the points where the bushings 160 and 160' are inserted at regular intervals, as above described, so that the first central wire, 149, will pass through the slot 165 in the rear guide-bar, 161, and the bushing 160 in the front guide-bar, 162. The second central wire, 149, will pass through the bushing 160' in the rear guide-bar, 161, and through the slot 165 in the front guide-bar, 162, and so on with each successive wire. (See Fig. 21.) Thus the neighboring wires can be brought together at either side alternately, to form the diamond-shaped mesh of the fencing, by the movement of the sliding guide-bars 161 and 162.

In Figs. 21 and 22 I have shown the positions which the neighboring wires will occupy in relation to each other when succeeding rows of barbs are applied to the same by the barbing-machine hereinbefore described.

In order to provide for a positive shifting of the sliding guide-bars 161 and 162, a strap or bar, 166, is secured to one end of the front guide-bar, 162, and a similar strap or bar, 167, is secured to the corresponding end of the rear guide-bar, 161. The outer ends of said straps 166 and 167 extend over and are acted upon by the double cam 168. (See Fig. 23.) The revolution of said double cam 168 therefore causes the guide-bars 161 and 162 to have a positive sliding motion back and forth in opposite directions at the same time.

Referring to Fig. 23 it will be seen that the front guide-bar, 162, is in its farthest position toward the right, while the rear guide-bar, 161, is in its farthest position toward the left, as is also the case in Fig. 21. By reversing both positions, which is accomplished by one-half a revolution of the double cam 168, the central wires, 149, which were together, will be drawn apart (see Fig. 22) and form the next combination for the operation of the barbing-machine.

I will now describe the mechanism for operating the double cam 168, and through it the guiding-bars 161 and 162, at the proper time. The double cam 168 is secured upon the shaft 169, having bearings 170 and 171, secured upon one side of the vertical swinging frame 164. (See Figs. 1 and 3.) A bevel-gear, 172, is secured upon the other end of the shaft 169 from the double cam 168 and meshes into and is operated by a bevel-gear, 173, on the shaft 174, which has bearings 175 formed upon the top of upright stands 176, (see Fig. 20,) secured at the rear of the frame 1. On the end of the shaft 174, to the right of the bevel-gear 173, (see Figs. 1 and 3,) is secured the large gear-wheel 177, which is operated by a small gear on the end of shaft 18 of the feeding mechanism, located below the plane of the shaft 174 and parallel therewith. (See Fig. 3.) One revolution of said small gear causes one-half of a revolution of the large gear 177, and also of the shaft 169, carrying the cam 168 for operating the sliding guide-bars 161 and 162, as above described.

The shaft 18, hereinbefore described, is operated at regular intervals by the side shaft 12, which is operated at regular intervals by the main shaft 3 through the intervention of the clutch mechanism connected with the shaft 12, hereinbefore described.

By referring to Figs. 1 and 3 it will be seen that the revolution of the shaft 18 causes the swinging arm 135, carrying the pawl 138, engaging the ratchet-wheel 139, to be operated, and, through the same, the feed-rolls for feeding in the main wires, in the manner hereinbefore fully described. At the same time the revolution of the shaft 18 causes the large gear-wheel 177 and its shaft 174 to be operated, and through it the shaft 169, carrying the double cam 168, which operates the sliding guide-bars 161 and 162, as above described. It will thus be seen that every time the shaft 18 revolves, operated by the side shaft 12, the main wires will be fed into the machine and the central wires be brought into their different relative positions ready for one row of barbs to be applied thereto by the barbing-machine.

I will now describe the mechanism for lowering and raising the main wires, so that each two of said main wires in succession will be depressed into the hopper-shaped stand 57 of the barbing-machine and into the longitudinal slot 56 in the coiling-spindle 54 at the proper time preparatory to the applying of a barb thereto by the barbing-machine, as before described, and then raised out of said coiling-spindle and hopper-shaped stand after the barb has been applied and the next two wires depressed into the slot in the coiling-spindle 54 to receive a barb and then raised out of said spindle, and so on, until a barb has been applied to each two of the main wires by the barbing-machine traveling under said main wires, as hereinbefore described, and one row of barbs completed, when the main wires are fed forward and the barbing operation is repeated.

The vertical swinging frame 164 is loosely mounted and supported on the shaft 174, turning in bearings 175 on the stands 176 at the rear of the machine, as before described. Upon said frame 164, at its forward end, are supported the guide-bars 161 and 162, as before stated, adapted to slide back and forth upon said frame, which also supports the bearings 170 and 171 of the side shaft 169, upon which the double cam 168 is secured, all as above described.

The vertical swinging frame 164, (most clearly illustrated in Figs. 1, 2, 3, and 20,) consists in this instance of two side arms, 164', through the rear ends of which the shaft 174 passes, and the brace 164'', connecting the arms 164' near their forward ends. The front ends of the arms 164' of the frame 164, carrying the sliding bars 161 and 162, pass in close proximity to the rear end of the spindle-stand 57 as the frame 164 is lowered and raised. (See Fig. 3.) Upon the outer ends of the arms 164' of the vertical swinging frame 164 are secured two arms, 178, projecting out from the front end of said frame 164 (see Figs. 2 and 3) and carrying at their outer ends two depressor-bars, 179 and 180, extending the width of the frame 164 or the length of travel of the barbing-machine. The inner depressor-bar, 179, is yieldingly connected at each end by means of rubber or pliable washers 181 with its supporting-arms 178, and is adapted to press upon the main wires and force the two main wires which are to be connected by a barb down into the longitudinal slot 56 in the coiling-spindle 54, at the forward end of said spindle, and hold them down in said slot while said spindle revolves and the barb is applied to the wires. Said depressor-bar 179 comes in contact with the wires being barbed just in front of the point where the barb is being applied. The depressor-bar 180 is outside of the depressor-bar 179 (see Fig. 3) and its use is not essential; but I prefer to use it to aid in depressing the main wires and to help hold down the main wires forming the mesh-fencing at a point just in front of the guide 70. It will thus be seen that the sliding guide-bars 161 and 162, through which the main wires pass just at the rear of the spindle-stand 57, in connection with the depressor-bars 179 and 180 at the front of said spindle-stand, serve to force down the main wires when the vertical swinging frame 164 is lowered and cause the two wires which are to be barbed to be forced into the longitudinal slot 56 in the coiling-spindle 54 (the hopper shape of the spindle-stand 57 guiding said wires) and hold said wires down in said spindle during the barbing operation. After the barbing operation the raising of the frame 164 causes the main wires confined in the guide-bars 161 and 162 to be raised up, so as to clear the top of the stand 57, and the wires just barbed to be drawn out of the spindle and spindle-stand to allow the barbing-machine to travel along preparatory to applying another barb, when the frame 164 is lowered and the next two main wires to be barbed are forced into the coiling-spindle, as above described, and the barbing operation repeated.

I will now describe the mechanism (illustrated in Figs. 2 and 3 of the drawings) for lowering and raising at the proper time the vertical swinging frame 164, and with it the main wires. In lieu of the mechanism shown any other suitable and equivalent mechanism may be employed. Upon the main shaft 3 at the right, Fig. 1, are secured two cams, 182 and 183, the former of which operates through intervening mechanism to raise the swinging frame 164 at its forward end and the latter to lower it. The cam 182, Figs. 1, 2, and 3, for raising the frame 164, operates against a roll, 184, mounted upon a standard, 185, supported upon a lever, 186, pivoted at one end, 187, to the under side of the frame 1 (see Fig. 3) and connected at its other end with the lower end of an upright rod, 188. The upper end of said rod 188 is connected with one end of a lever, 189, supported and pivoted at its central point above the machine. (See Fig. 2.) The other end of the lever, 189, is connected by a rod, 190, with diverging arms 191, secured at their lower ends to the outer ends of the arms 164' of the swinging frame 164. The cam 183 for lowering the frame 164 operates against a roll, 192, mounted in the outer end of a lever, 193. The other end of said lever 193 is pivoted in a bracket, 194, secured to the rear of the frame 1. (See Fig. 3.) At a point between the two ends of said lever 193 the upper end of a rod, 195, is connected with said lever 193, and the lower end of said rod 195 is connected with one end of a lever, 196, supported and pivoted near its central point below the frame 1. (See Figs. 2 and 3.) The other end of the lever 196 is connected with the lower end of an upright rod, 197. The upper end of said rod 197 is connected with the cross-bar 164'', connecting the two arms 164' of the swinging frame 164. (See Figs. 2 and 3.) As the main shaft 3 of the machine revolves the cam 183 will operate at the proper time to lower the front end of the swinging frame 164 through the system of levers and connecting-rods above described and cause the main wires to be depressed and the two wires to be barbed to enter into the slot in the coiling-spindle, as above described. The main shaft 3, continuing to revolve, will cause the cam 182 to operate at the proper time to raise the front end of the swinging frame 164 through the system of levers and connecting-rods above described and cause the main wires to be raised up above the spindle-stand 57 to allow of the barbing-machine traveling along preparatory to operating again when the main wires are again lowered, all as above described. At the same time that the bevel-gear 15 on the rear end of the side shaft 12 causes the mechanism for feeding in the main wires at the rear of the machine to be operated, as above described, the bevel-gear 16, secured on the front end of the shaft 12, causes the take-up mechanism at the front of the machine to be operated simultaneously.

I will now describe the take-up mechanism. The bevel-gear 16 at the front end of the side shaft 12 meshes into the bevel-gear 17 on the outer end of the shaft 20 of the take-up mechanism. Said shaft 20 turns in bearings 198, secured upon the frame 1, and has secured upon its end opposite from the bevel-gear 19 a crank, 199. The crank 199 is connected by a rod, 200, with the outer end of a lever, 201, pivoted at its inner end upon the shaft 202, turning in bearings 203, secured upon the frame 1, (see Fig. 1,) and upon which shaft the take-up drum 204 is secured. To the pivoted lever-arm 201 a pawl, 205, is pivoted, which is adapted to engage the teeth of a ratchet-wheel, 206, secured upon the shaft 202. A spring check-pawl, 207, secured at its lower end upon the frame 1, (see Fig. 3,) also engages the teeth of the ratchet-wheel 206 upon the opposite side from the pawl 205, and serves to prevent the ratchet-wheel 206 and the take-up drum 204 from revolving backward when the pawl 205 is released from the ratchet-wheel 206. The take-up drum 204 is secured upon and revolves with the shaft 202, supported in bearings 203, as before stated. Said take-up drum 204 is provided with grooves 208 extending around the circumference thereof, in which are placed at regular intervals pins 209 projecting up therefrom, which enter the fencing behind the barbs 210 and draw it forward as the take-up drum revolves. (See Fig. 1.)

I have shown in Figs. 25 to 28, inclusive, details of construction of the take-up drum which I use in practice, but which, for the sake of clearness in the drawings, I did not illustrate in Figs. 1 and 3, a take-up drum with plain ends being shown in said figures.

Referring to Fig. 26 it will be seen that at the outside rims or flanges of the take-up drum 204 a number of clamping-levers, 211, are arranged, which are for clamping the selvage-wires 148 at each side of the fencing to the lugs or projections 212 cast upon or fastened to the flanges of the take-up drum 204, and thus keep the fencing stretched out to its full width and at the same time serve to draw it along as the take-up drum revolves. At the left in Fig. 26 a section of one end of the take-up drum 204 is represented, which shows the manner of construction and operation of a clamping-lever 211. Said lever 211 is pivoted at 213 to the flange of the take-up drum 204, and is provided at its lower end with a roll, 214, which travels along as the take-up drum revolves upon the cam-surface 215, secured upon the bearings 203 of the shaft 202 at each end of the take-up drum. The cam-surface 215 (see Figs. 25, 26, and 27) forces the lower ends of the clamping-levers 211 toward the take-up drum, and consequently the upper ends toward the lugs 212, thus clamping the selvage-wires 148, passing between said lugs 212 and the upper ends of the clamping-levers 211, and holding them securely as the take-up drum revolves until the roll 214 at the lower end of said clamping-levers 211, passing off from the cam-surface 215, allows the clamping-levers to be opened and the selvage-wires which were held to be released and leave the flanges of the take-up drum.

For the purpose of keeping the roll 214 at the lower end of the clamping-lever 211 against the cam surface 215 and the upper end of said lever away from its lug 212, except when the roll is acted upon by the cam-surface 215 at the proper time, I in this instance employ a pin, 216, attached to the inside of the lever 211, which has a spiral spring, 217, encircling it, bearing at one end against the lever 211 and at the other end against a plate, 218, secured within the end of the take-up drum, and through which plate the end of the pin 216 projects. (See Fig. 26.) In connection with the take-up drum for drawing the completed fencing forward preparatory to the same being wound or reeled upon a receiving-spool, (not shown in the drawings,) I employ two pairs of guide or sprocket wheels, 219 and 220, located at the rear and above the take-up drum, for the purpose of guiding the completed fencing to the take-up drum in a proper manner and at the same time keeping the fencing to its full width preparatory to its being delivered to the take-up drum. The upper pair of guide-wheels, 219, are supported upon a shaft, 221, mounted in the outer ends of two vertical swinging arms, 222, which are supported and pivoted at their lower ends on the bearings 203 of the shaft 202 at each end of the take-up drum 204. (See Fig. 25.) The lower pair of guide-wheels, 220, are supported upon a shaft, 223, mounted in the lower ends of the arms 224, which are supported at their upper ends upon the ends of the shaft 202. (See Figs. 25 and 28.)

The completed fencing, as it passes to the take-up drum 204, will pass between the upper and lower pair of guide or sprocket wheels, 219 and 220, and the projecting pins or sprockets thereof will come inside of the selvage-wires 148 and keep the fencing to its full width and guide it so that the selvage-wires will pass between the clamping-levers 211 and their lugs 212, arranged on the flanges of the take-up drum to be clamped therein and drawn along, as before described.

A rod, 225, secured at its lower end to the supporting arms 222 and at its upper end to a pivoted lever or support of ordinary construction (not shown in the drawings) supported above the machine, serves to hold said arms in position, and a spiral spring, 226, secured at its upper end to one or both of the arms 222 and its lower end to the frame 1 of the machine, tends to draw down said arms and the guide-wheels 219 and 220 supported thereon when they are raised up by the action of the swinging frame 164 in raising the main wires up above and out of contact with the spindle-stand 57, as above described.

The rod 225 may, if desired, be connected with a lever provided with connecting mechanism for operating the same similar to that above described and illustrated in connection with the swinging frame 164, or said rod 225 may be directly connected with the lever 189 of said swinging frame, (see Fig. 2,) so that the guide or sprocket wheels 219 and 220 will have a positive up-and-down motion simultaneously with the swinging frame 164 and the depressor-bars 179 and 180 secured thereon, and thus act in connection with said frame 164 to lower the wires into the spindle-stand and raise them out of the same at the proper time.

From the above description the operation of the take-up drum 204 will be readily understood, and is as follows: The revolution of the shaft 12 at the proper time causes the shaft 20 to be revolved, and through the crank 199 thereon and the connecting-rod 200 the lever 201 carrying the pawl 205. (See Figs. 1 and 3.) Said pawl 205 engages and operates the ratchet-wheel 206, secured upon the shaft 202, and through said ratchet-wheel the take up drum 204, secured upon said shaft.

Operation of the machine: From the above description, in connection with the drawings, the operation of my machine for making barbed-wire mesh-fencing will be readily understood by those skilled in the art, and a connected idea of the whole operation may be obtained by referring to Figs. 1, 2, and 3 of the drawings. The several parts of the machine should be in substantially the position shown in said figures. The main wires (in this instance eleven in number) are taken from delivery reels or spools properly arranged and supported at the rear of the machine (not shown in the drawings) and passed through the guide-holes 159 in the guide-bar 158 at the rear of the machine, (see Figs. 19 and 20,) and then between the upper and lower sets of feed-rolls, 145 and 143, to the sliding guide-bars 161 and 162, supported on the swinging frame 164, which is in its highest position, said wires being passed through the bushings 160' and 160 and the slots 165 in said guide-bars in the manner above described. (See Figs. 21 and 22.) From the guide-bars 161 and 162 the main wires are passed over the barbing-machine below the depressor-bars 179 and 180 and between the guide or sprocket wheels 218 and 219 to the take-up drum 204, and from there to the receiving spool or reel beyond. (Not shown in the drawings.) The barb-wires 31, or wires for forming the barbs, are taken from delivery-reels located one at each side of the machine, only one of which, 227, is shown in the drawings, (see Fig. 1,) and carried up over the frame 1 to the barb-feeding mechanism and passed between the stationary plates 32 and grip-levers 34, and then between the cap-pieces 43 and pawls 44 on the slides 42 of the feeding mechanism, so that their ends will project out toward the front end of the coiling-spindle 54 (see Fig. 7) preparatory to being fed in between the coiling-fingers 55 thereof. The sliding guide-bars 161 and 162 at the rear of the spindle-stand 57 are in position to bring the first two main wires to be united by a barb closely together, and the hopper-shaped spindle-stand 57, supported on the bed of the barbing-machine, is directly underneath the first two main wires. The machine is now started through belt-connection with the driving-pulley 2, secured on the main shaft 3, which sets in motion the side shafts 28 and 81 of the barbing-machine 6 through the intervention of the bevel-gears 26 and 29, secured on each end of the sleeve 22, supported and sliding on the main shaft 3 and revolving with said shaft, and also the clutch-sleeve 9, mounted loosely on the side shaft 12. The vertical swinging frame 164 (carrying the sliding guide-bars 161 and 162, confining and holding the main wires at the rear of the spindle-stand 57, and also the depressor-bars 179 and 180, extending out beyond the front of said spindle-stand) will descend through the rotation of the cam 183 on the main shaft 3, connected with said frame 164 by the intervening mechanism, consisting of roll 192, lever 193, rod 195, lever 196, and rod 197, (see Figs. 2 and 3,) and force the two wires to be barbed into the spindle stand 57, and into the longitudinal slot 56 in the coiling-spindle 54, which then, by means of its operating-cam 68 on shaft 28 and intervening mechanism, consisting of roll 60, angle-lever 64, sector-gear 63, pinion 62, and gear 59 on shaft 60, and gear 58 on the end of the coiling-spindle, (see Figs. 4, 7, and 8,) makes one-quarter of a revolution, thereby imprisoning the two main wires in the longitudinal slot 56 in the coiling-spindle 54 and presenting the coiling-fingers 55 one above the other, between which the barb-wires 31 are now fed forward (one from each side and cross between said fingers) by the barb-feeding mechanisms, as hereinbefore described, operated simultaneously on each side of the coiling-spindle by the operating-cams 40 and 53, secured on side shaft 28, and intervening mechanism connecting said cams with said barb-feeding mechanisms. The coiling-spindle 54 now makes one or more complete revolutions, according to the number of times the barb-wires are to be coiled around the main wires, and then stops and turns back until its longitudinal slot opens upward. The mechanism for cutting off the barb-wires is now operated by its operating-cam 77, secured on the sleeve 22. (See Figs. 4 and 8.) The sliding guide-bars 161 and 162, in connection with the depressor-bars 179 and 180, serve to hold the main wires down in place in the coiling-spindle 54 during the operation of cutting off the barb-wires 31. After the barb-wires are cut off, the swinging frame 164 is raised up through the rotation of the cam 182 on the main shaft 3, connected with said frame 164 by the intervening mechanism, consisting of roll 184, stand 185, lever 186, rod 188, lever 189, rod 190, and arms 191, (see Figs. 2 and 3,) and the raising of said frame 164 draws the two main wires, now united together by a barb, out of the spindle-stand 57, and allows the barbing-machine to be drawn along. Said barbing-machine is now drawn along toward the left by the pulling-creeper 86, operated by the double crank 83 on the side shaft 81 of the barbing-machine, as above described, until the hopper-shaped spindle-stand of the barbing-machine comes under the next two wires to be united by a barb. The coiling-spindle has in the meantime turned back to its original position, the swinging frame 164 is again depressed, and the barbing operation is again repeated, as above described, and so on until the barbing-machine has traveled across the mesh-fencing and one row of barbs has been applied. When the barbing-machine reaches its last position on the left and the last two main wires have been barbed, the cam 109, secured on the end of the side shaft 28 of the barbing-machine, will operate the lever 130, and through it the lever 110, connected through lever 112 with the forked rod 116, of the clutch mechanism, causing the shaft 12 to become connected with sleeve 9 in the manner above described, and to be revolved. The revolution of the shaft 12 causes the feed-rolls 143 and 145 to revolve and the main wires to be fed forward at the rear of the machine through the intervention of the shaft 18 and mechanism intervening between said shaft and feed rolls, as above described, and also causes the sliding guide-bars 161 and 162 to be shifted by their operating-cam 168 through the shafts 169 and 174, operated by connection with shaft 18, as above described, thus bringing the main wires in their proper relative positions preparatory to receiving another row of barbs. At the same time, and simultaneously with the feeding in of the main wires at the rear of the machine, the take-up drum 204 at the front of the machine is operated by the said shaft 12 through the shaft 20. Immediately after the main wires are fed forward the side shaft 12 ceases to revolve and the barbing-machine commences to travel back from left to right, operated by the pushing-creeper 87, as above described, driven by the double crank 83 on the side shaft 81, the pulling-creeper being held up out of contact with its toothed rack, as above described, and the process of applying the second row of barbs proceeds in the same manner as described above in connection with the first row. When the barbing-machine reaches its last position at the right and the last two main wires have been united by a barb, the cam 109, secured upon the end of the side shaft 28 of the barbing-machine, will operate the lever 110, connected through lever 112 with the forked rod 116 of the clutch mechanism, and cause the side shaft 12 to be a second time revolved, in the same manner as described above, and the feeding and take-up mechanisms for the main wires to be again operated as before. The barbing-machine again travels back from right to left to apply the third row of barbs, and thus the machine continues to operate, applying one row of barbs after another without stopping, and operating automatically to manufacture the barb-wire mesh-fencing as long as the main wires and barb-wires are fed to the machine.

The machine illustrated in the drawings is adapted to make a mesh-fencing with four pointed barbs; but the machine can be used to make a mesh-fencing with two pointed barbs by simply feeding in only one barb-wire upon one side of the machine instead of two barb-wires, one upon each side of the machine, as described above.

The mesh-fencing may be made wide or narrow, as desired, according to the number of main wires used, and the openings in the fencing may be made small or large, as desired, the rows of barbs being close together or at some distance from each other.

It will be understood by those skilled in the art that the details of construction of the several parts of my machine and of the mechanisms for carrying out and performing the separate steps in the manufacture of the fencing may be varied somewhat from those described and illustrated in the drawings without departing from the principle of my invention, and other well-known and equivalent means for operating the several mechanisms may be employed in lieu of those shown and described, if preferred.

Having thus described my machine for making barbed-wire mesh-fencing, what I claim as new, and desire to secure by Letters Patent, is—

1. In a machine for making barb-wire mesh-fencing, the combination, with mechanism for feeding forward the main wires and mechanism for lowering and raising into and out of the action of the barbing-machine the main wires to be united by a barb, of mechanism for feeding forward the barb-wire, coiling it around each pair of main wires, and cutting it off, and means for operating the several mechanisms in due order, substantially as set forth.

2. In a machine for making barb-wire mesh-fencing, the combination, with mechanism for feeding forward the main wires, mechanism for shifting the relative positions of the main wires, and mechanism for lowering and raising the main wires to be united by a barb into and out of the action of the barbing-machine, of mechanism for feeding in the barb-wire, coiling it around each pair of main wires, and cutting it off, and means for operating the several mechanisms in due order, substantially as set forth.

3. In a machine for making barb-wire mesh-fencing, the combination, with mechanism for feeding forward the main wires, mechanism for taking up the completed fencing, and mechanism for shifting the relative positions of the main wires, of mechanism for lowering and raising the main wires to be united by a barb into and out of the action of the barbing-machine and mechanism for feeding in the barb-wire, coiling it around each pair of main wires, and cutting it off, and means for operating the several mechanisms in due order, substantially as set forth.

4. In a machine for making barb-wire mesh-fencing, the combination, with mechanism for applying barbs to the main wires, and mechanism for feeding forward the main wires, of mechanism for shifting the relative positions of the main wires after each row of barbs is applied preparatory to receiving another row of barbs to form a mesh-fencing whose central wires have a zigzag course, and means for operating said mechanisms, substantially as set forth.

5. In a machine for making barb-wire mesh-fencing, the combination, with mechanism for feeding forward the main wires, and mechanism for taking up the completed fencing, of mechanism for lowering and raising the main wires to be united by a barb into and out of the action of the mechanism for coiling on and cutting off the barb-wire, and said mechanism for coiling on and cutting off the barb wire, and means for operating the several mechanisms in due order, substantially as set forth.

6. In a machine for making barb-wire mesh-fencing, the combination, with mechanism for feeding forward the main wires and mechanism for shifting the relative positions of the main wires preparatory to each row of barbs being applied thereto, of mechanism for lowering and raising the wires to be united by a barb into and out of the action of the barbing mechanism, and said barbing mechanism for feeding in, coiling on, and cutting off the barb-wire, and means for operating the several mechanisms in due order, substantially as set forth.

7. In a machine for making barb-wire mesh-fencing, a barbing-machine adapted to travel from side to side of the fencing-machine in the direction of the width of the fencing and to apply to each pair of main wires in succession a barb, and means for operating said barbing-machine, substantially as set forth.

8. In a machine for making barb-wire mesh-fencing, a barbing-machine adapted to travel back and forth in the direction of the width of the fencing in the process of applying barbs to the main wires, and provided with a coiling-spindle having a longitudinal slot therein, for the purpose stated, substantially as set forth.

9. In a machine for making barb-wire mesh-fencing, a barbing-machine adapted to travel back and forth in the direction of the width of the fencing in the process of applying barbs to the main wires, provided with mechanism for feeding in and cutting off the barb-wire, in combination with a coiling-spindle for coiling on the barb-wire, provided with a longitudinal slot therein, for the purpose stated, substantially as set forth.

10. In a machine for making barb-wire mesh-fencing, the combination, with mechanism for feeding forward the main wires, and mechanism for lowering and raising the main wires to be barbed, into and out of the action of the barbing-machine, of said barbing-machine adapted to travel back and forth in the direction of the width of the fencing, and to apply a barb to each pair of main wires in succession, substantially as set forth.

11. A barbing-machine, 6, adapted to travel back and forth in the direction of the width of the fencing, and to apply to each pair of main wires in succession a barb, and means for operating said barbing-machine, and the several mechanisms thereof in due order, substantially as set forth.

12. The combination, with a vertical swinging frame, of sliding guide-bars mounted on said frame and provided with bushings and longitudinal slots therein to confine the main wires of the mesh-fencing, and to shift the relative positions thereof, and means for raising and lowering said frame and operating said guide-bars, substantially as set forth.

13. In a machine for making barb-wire mesh-fencing, the combination, with a barbing-machine adapted to travel back and forth in the direction of the width of the fencing in the process of applying the barbs thereto, and carrying a cam, 109, upon its side shaft 28, of the side shaft 12 of the machine, for putting into operation at the proper time the mechanisms for feeding in and taking up the main wires, provided with a clutch mechanism, and intervening mechanism connecting said clutch mechanism with the cam 109, for the purpose stated, substantially as set forth.

14. The take-up drum 204, provided with projecting pins 209, and clamping-levers 211, and holding-lugs 212 upon its ends or flanges, and means for operating said levers to clamp the selvage-wires of the fencing, substantially as set forth.

15. In a machine for making barb-wire mesh-fencing, the combination, with the spindle-stand of the barbing-machine, having a hopper-shaped top, and the slotted coiling-spindle mounted in said stand, of forked guides located at the rear and front of said spindle-stand, for the purpose stated, substantially as set forth.

16. The combination, with mechanisms for feeding forward and taking up the main wires of a wire-mesh fencing, of a barbing-machine for applying the barbs thereto, and mechanism for causing said barbing-machine to move back and forth in the direction of the width of the fencing in the process of applying the rows of barbs thereto, and means for operating said mechanisms in due order, substantially as set forth.

JOHN D. CURTIS.

Witnesses:
  JOHN C. DEWEY,
  M. RALPH DRYDEN.